(12) United States Patent
Kumar et al.

(10) Patent No.: US 8,301,528 B2
(45) Date of Patent: Oct. 30, 2012

(54) PROCUREMENT SYSTEM MANAGING OFF-CONTRACT INTERNET PURCHASES

(75) Inventors: Pravin Kumar, Palo Alto, CA (US); Sanjay Swamy, Bangalore (IN)

(73) Assignee: Ketera Technologies, Inc., Santa Clara, CA (US)

( * ) Notice: Subject to any disclaimer, the term of this patent is extended or adjusted under 35 U.S.C. 154(b) by 0 days.

(21) Appl. No.: 11/521,719

(22) Filed: Sep. 15, 2006

(65) Prior Publication Data

US 2007/0078733 A1   Apr. 5, 2007

Related U.S. Application Data

(60) Provisional application No. 60/717,451, filed on Sep. 15, 2005.

(51) Int. Cl.
*G06Q 40/00* (2012.01)
*G06Q 30/00* (2012.01)

(52) U.S. Cl. .......................................... 705/35; 705/26

(58) Field of Classification Search ................ 705/26, 705/35

See application file for complete search history.

(56) References Cited

U.S. PATENT DOCUMENTS

| | | | | |
|---|---|---|---|---|
| 6,850,900 | B1* | 2/2005 | Hare et al. | 705/80 |
| 6,873,967 | B1* | 3/2005 | Kalagnanam et al. | 705/26.44 |
| 2002/0178077 | A1* | 11/2002 | Katz et al. | 705/26 |
| 2003/0023505 | A1* | 1/2003 | Eglen et al. | 705/26 |
| 2003/0065573 | A1* | 4/2003 | Nagel et al. | 705/26 |
| 2003/0195934 | A1* | 10/2003 | Peterson et al. | 709/206 |

OTHER PUBLICATIONS

De Burca, Sean; "Strategic technology adoption: extending ERP across the supply chain"; Journal of Enterprise Information Management; v18n4, pp: 427-440; ISSN: 1741-0398; 2005.*
Business_wire; "Remedy and U.S. Bancorp Provide Complete Online Purchasing Solution; Alliance Autoamtes and Speeds Purchasing Process From Requisition to Payment"; p. 0064; Apr. 25, 2000.*
Gilbert, Alorie; "E-procurement Problems behind the promise"; Informationweek; n813; pp: 48-62; Nov. 20, 2000; ISSN: 8750-6874.*

* cited by examiner

*Primary Examiner* — Lalita M Hamilton
*Assistant Examiner* — Edward Chang
(74) *Attorney, Agent, or Firm* — Boyle Fredrickson, S.C.

(57) ABSTRACT

A procurement system permits routine purchases through approved vendors in a catalog as well as off-catalog purchases via the web, the latter using a web access program that captures product information from the web to invoke the approval process normally used for catalog purchases.

15 Claims, 3 Drawing Sheets

PROCUREMENT SYSTEM MANAGING OFF-CONTRACT INTERNET PURCHASES

CROSS-REFERENCE TO RELATED APPLICATIONS

This application claims the benefit of U.S. Provisional application 60/717,451, filed Sep. 15, 2005, hereby incorporated by reference.

STATEMENT REGARDING FEDERALLY SPONSORED RESEARCH OR DEVELOPMENT

--

BACKGROUND OF THE INVENTION

Companies use procurement systems to manage their purchases of supplies and equipment, helping them ensure they get the correct merchandise and appropriate quality for the best price, and allowing them to track their expenditures for accounting purposes.

An electronic procurement system, for example, that is manufactured by Ketera Technologies, Inc. of Santa Clara, Calif., the assignees of the present invention, may provide an electronic catalog of approved suppliers, together with negotiated prices and product descriptions. Typically, but not always, these approved suppliers will be subject to a pre-existing contract with the purchaser or the purchaser's agent to provide for certain levels of service and prices, as well as other terms normally embodied in standard purchase agreements.

A person using the electronic procurement system may review the catalogs and identify a product that they wish to purchase, entering a command to initiate the procurement process.

The procurement system captures data from the catalog giving the product description and price, and adds business specific information about the purchaser's location, department, and/or budget. This data is applied to a set of rules that define an approval path for the purchase, such rules considering, for example, the dollar amount of the purchase, the type of product, and the particular department.

Often the approval process will involve forwarding requests to particular persons in the organization to make the necessary approval. This may be done over a network by means of an e-mail, web page, or the like. Once the approval is given for the purchase, a purchase order may be automatically sent to the supplier and the originator of the purchase may be notified, again by e-mail or the like.

Sometimes a purchaser may need to purchase supplies "off-contract" or outside of the supplies listed in procurement system. This may be driven by out-of date prices in the procurement catalogs, or the unavailability of particular desired products. Such "maverick purchases" are not captured by the procurement system, and thus represent a loss of accountability for purchases by the company.

Nevertheless, it may be desirable or necessary to provide employees with a certain degree of flexibility to accommodate such purchases outside of the established vendors to provide purchasers with the greatest possible range of goods and services. Competition from off-contract vendors can provide a healthy, competitive pressure on the pricing of contract vendors.

BRIEF SUMMARY OF THE INVENTION

The present invention provides a procurement system that allows routine purchases through approved vendors using standard procurement practices, but also allows buyers to select products from off-contract vendors on the Internet while still availing themselves of the approval process of the procurement system, both to approve and track the particular purchase. Importantly, this system works without prior arrangement or agreement with the off-contract vendors, but simply by interfacing with their existing web commerce sites.

Specifically then, the present invention provides an electronic procurement system executing a procurement program that receives requests for a purchase of products, along with product identification information, to automatically processing approvals for these purchases. The product information may come from an electronic catalog of products of contract suppliers or from a web access program viewing web pages of non-contract suppliers. In this latter case, the web access program generates identification information for the product so that the procurement program can process approval of purchase of the product.

It is thus one object of at least one embodiment of the invention to provide a way to obtain the benefits of Internet purchasing while still integrating such purchases into a formal and automatic approval process.

The procurement program may generate an order for the product after approval is processed.

It is thus another object of the invention to provide a way of enforcing use of the approval process for web purchases. Requiring that the procurement program does the actual purchase, for example, to use a corporate credit card, ensures that purchasers must invoke the procurement program.

The web access program may collect product identification information for the second product by filtering web page data associated with an order partially completed for the second product on a web page of the non-contract supplier by the user.

It is thus one object of at least one embodiment of the invention to automatically integrate web purchases into a procurement process for a wide range of third party web sites not intended for such integration.

The procurement program may notify the user to terminate the web order upon approval.

It is thus one object of at least one embodiment of the invention to leverage off of the data collection provided by standard shopping cart systems, by invoking the first stages of a shopping cart order.

The web access program may select a filter for filtering web page data from a set of different filters identified to different websites.

It is thus one object of at least one embodiment of the invention to improve the accuracy of automatic data collection from standard un-tagged web pages by the construction of a library of filters associated with one or more web sites or standard shopping systems.

The web access program may collect product information for the second product by consulting a web service associated with a web page offering the second product.

It is therefore one object of at least one embodiment of the invention to make use of web services offered for some websites.

The web access program may allow both the electronic catalog of products of contract suppliers and the web pages of non-contract suppliers to be accessed.

It is an object of at least one embodiment of the invention to provide an integrated shopping experience for the purchaser.

The procurement program may process approvals for purchases by applying a set of predefined rules to the product information and information about the user.

It is thus one object of at least one embodiment of the invention to provide the ability to automatically apply purchasing rules to purchases made on third party web sites.

The predefined rules may include checking whether a user's budget will allow the purchase.

It is an object of at least one embodiment of the invention to provide budget discipline to website purchases.

The predefined rules may check if the purchaser has consulted the electronic catalog for the second product.

It is thus one object of at least one embodiment of the invention to encourage use of pre-approved vendors.

The predefined rules may include determining if the second product can be found less expensively in the electronic catalog.

It is one object of at least one embodiment of the invention to discourage costly web purchases.

The web access program may identify preferred web pages to the user.

It is therefore one object of at least one embodiment of the invention to provide ready access to a user of the system of the present invention to useful or preferred third party web sites.

The preferred web pages may be those having either web services or filters that may be used to extract product identification information from web page data.

It is thus one object of at least one embodiment of the invention to steer users to known compatible sites.

The procurement program may process approvals for purchases by communicating with an authorizing individual.

It is thus one object of at least one embodiment of the invention to preserve a level of human control over Internet purchases.

The web access program may include a web service database of web services linked to URLs of web pages and may determine whether a web service is available by reading a current URL of the web page and consulting the table.

It is thus another object of at least one embodiment of the invention to simply determine whether a web service exists.

A web service update program may download new web service data to the web access program.

It is yet another object of at least one embodiment of the invention to provide a dynamic and growing universe of possible web sites for purchases.

These particular objects and advantages may apply to only some embodiments falling within the claims and thus do not define the scope of the invention.

DETAILED DESCRIPTION OF THE PREFERRED EMBODIMENT

Figure 1:
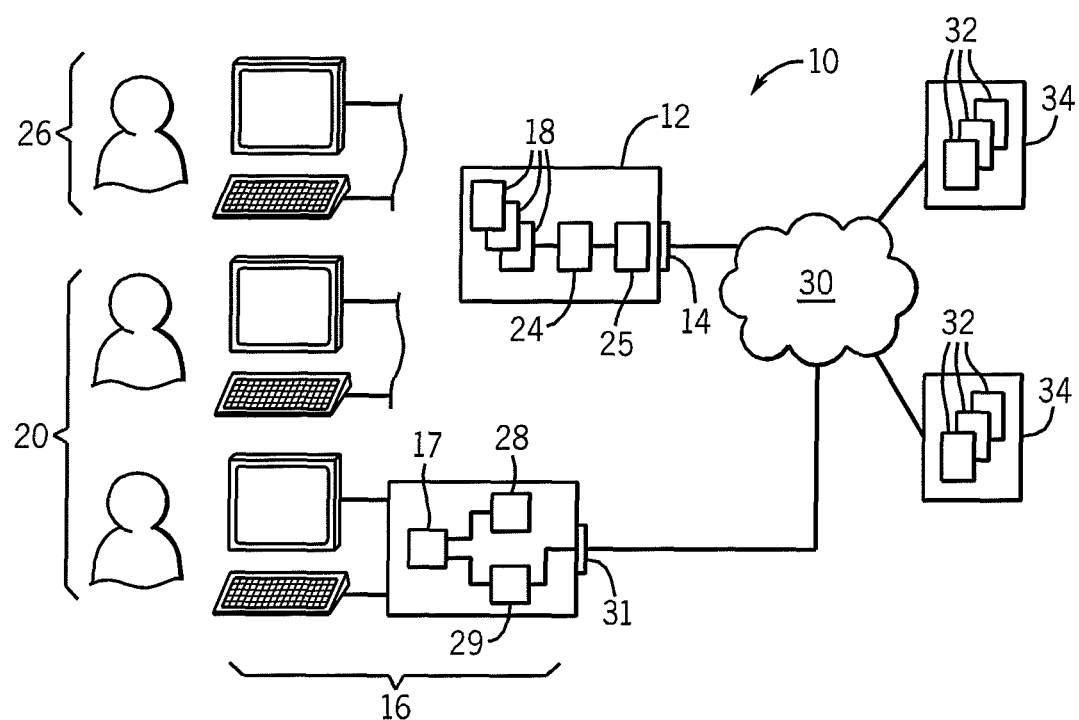
FIG. 1 is a block diagram of a set of computers providing connections for purchasers to an electronic catalog and to the Internet for purchasing products and providing purchase authorization per the present invention.

Referring now to FIG. 1, a procurement system 10 of the present invention may employ one or more electronic computers 16 communicating with purchasers 20 and approval agents 26.

Each computer 16 may provide an operating system 17 (such as Microsoft Windows XP manufactured by Microsoft of Redmond, Wash.) communicating with a browser 29 (such as Internet Explorer also manufactured by Microsoft) connected by an Internet port 31 to the Internet 30.

A procurement system computer 12 may also connect to the Internet 30 via an Internet port 14 to coordinate procurement with the purchasers 20 and agents 26 over the Internet 30 via a server program 25. In this capacity, the procurement system computer 12 may store and/or access a set of electronic catalog pages 18, for example in database form, representing product offerings of vendors and providing descriptions and prices of the products. A procurement program 24, called by the server program 25, allows the catalog pages 18 to be searched electronically by the purchasers 20 viewing a web page provided by the server program 25, so that the purchasers may select particular products and initiate a purchase requisition electronically. The vendors represented by the catalog pages may or may not be under contract with the organization employing the purchasers 20 and agents 26, but are typically preapproved.

The electronic purchase requisition processed by the procurement program 24 captures the product information as well as data about the purchaser 20 and the purchaser's department, budget and similar information. This latter information may be entered by the purchaser 20 at the time of the selection of the products, or may be stored in a manner associated with a purchaser password or the like entered by the purchaser, or may be stored on the purchaser's computer 16 (for example as a cookie).

The product information and data about the purchaser 20 is evaluated by a rules engine within the procurement program 24 which, based on the captured data and stored rules established by the purchasing organization, identifies an approval path, that is, the steps necessary to authorize the purchase. Typically, the approval path includes review of the purchase data by an approving agent 26 of the purchasing organization. The approving agents 26 may handle the approval electronically by the exchange of e-mails or the like, automatically generated by the procurement program 24 and forwarded to the computer 16 of the approving agent, or by the approving agent periodically visiting a website hosted by the server program 25.

If the purchase from catalog pages 18 is approved, the procurement program may send an order out either electronically over the Internet 30 or by means of the mail or telephone automatically or manually. Such systems are known in the art as has been described above.

Referring still to FIG. 1, the present invention provides an improvement to the above system allowing the approval process to be applied to products and vendors not represented in the catalog pages. In one embodiment, the present invention provides a web access program 28 in the form of a browser plug-in on the computers 16 of the purchasers 20. As will be described in more detail below, the web access program 28 allows individual purchasers 20 to review not only the catalog pages 18 of approved vendors held within the computer 12, but also catalog pages 32 of Internet commerce sites offering their products through websites 34 generally accessible to the public through standard browser programs.

Figure 2:
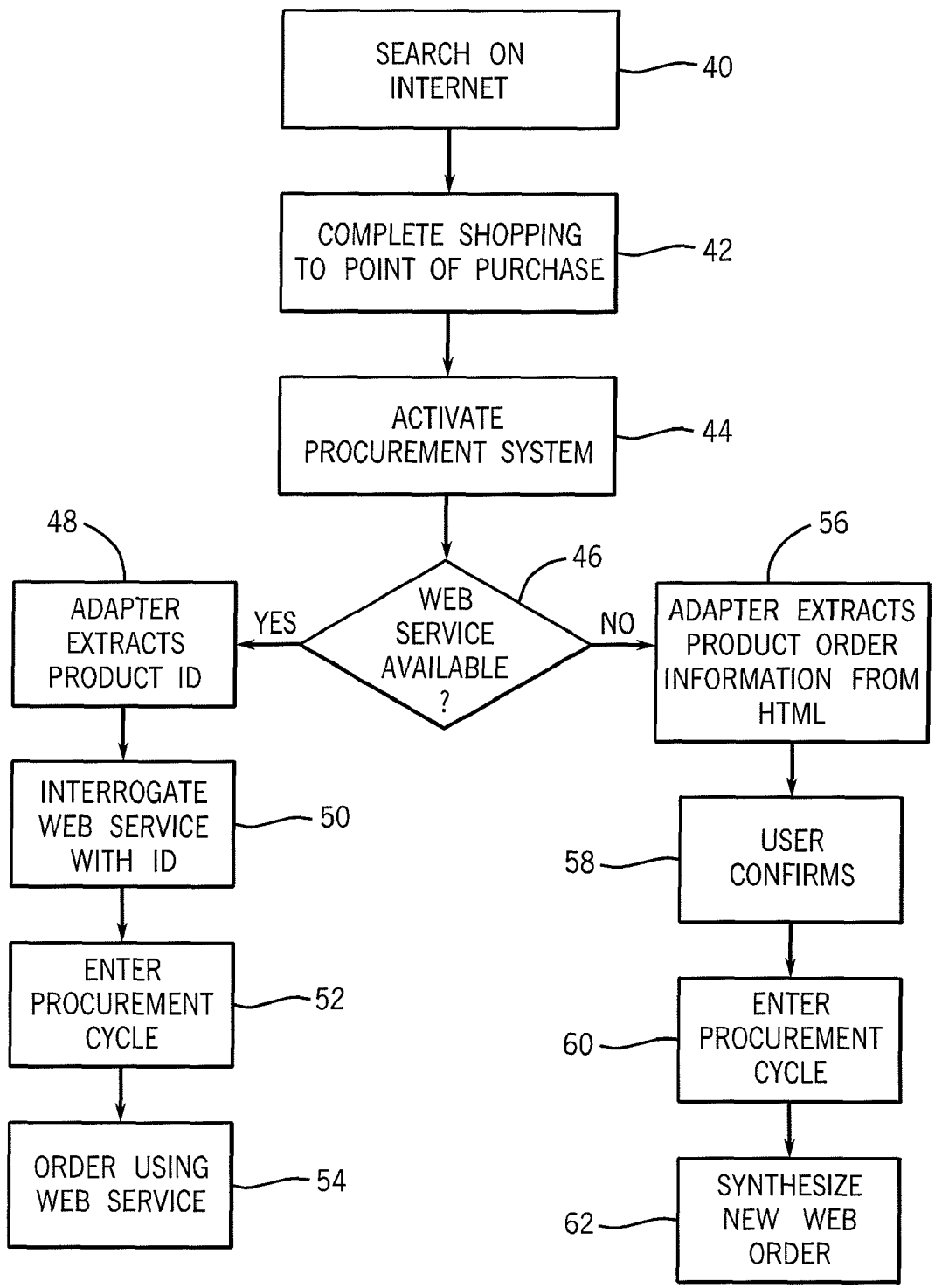
FIG. 2 is a flow chart of a program executable on a computer of a purchaser to capture Internet purchases outside of the electronic catalog for incorporation into the authorization process used by purchases in the electronic catalog.

Referring now to FIGS. 1 and 2, the procurement program 24 and web access program 28 work together to bring Internet purchases into the procurement system. As indicated by process block 40, in a first step, the web access program 28 allows the purchaser 20 to search the Internet 30 directly for a desired product using the standard browser 29. Generally, the entire Internet may be available for searching without interference although selected web pages may be highlighted in a "favorites" type list. Alternatively, this ability to search the Internet may be conditioned on the identity of the purchaser 20 or a precondition that the purchaser 20 has recently searched the catalog pages 18 and failed to find the necessary products, as may be automatically assessed.

The particular search may be performed using standard web search engines such as Google (www.google.com) or other freely available product search engines or may employ a list of pre-approved websites representing sites compatible with the web access program 28 but not necessarily, and typically not, sites having prearranged business agreements with the organization employing the purchaser 20.

Referring now to process block 42, when a desired product is found on an Internet website 34, the purchaser 20 completes the necessary steps on that website 34 to make a purchase, just short of authorizing payment. This may, for example, include filling out information for a virtual shopping cart system indicating the desired merchandise and quantities. At this point, as indicated by process block 44, the purchaser 20 activates the web access program 28, for example using a button 66 on a toolbar on the browser screen 68 (shown in FIG. 3) of the browser 29 activating the plug in of the web access program 28.

Referring now to decision block 46, at this time the web access program 28 identifies the URL of website 34 currently accessed by the browser 29 to determine whether the website has a web service available. As is understood in the art, a web service provides for an electronic communication of data between a website 34 and remote computers using, for example, data tagged with XML tags. This determination may be done by reviewing a data table held or accessed by the web access program 28 and periodically updated, for example, by Internet downloads, as is understood in the art, from a central source authorized by the purchasing organization.

If a web service is available, then at process block 48, the web access program 28 identifies an adapter prewritten for the web service for that website 34. The adapter is a computer program or script that reviews the HTML data of the current website to extract a product identification code uniquely identifying the product sought by the purchaser 20 and a quantity of the product. Typically a single adapter may work for multiple websites 34.

Generally, it cannot be assumed that the web page being viewed by the purchaser 20 has a web service or the necessary data clearly tagged. In these cases, as indicated by process block 56, the adapter will need to interpret the HTML fields and the surrounding text of the website 34 itself. This can be done by viewing the shopping cart page of the web page in source HTML and identifying likely key words indicating the key fields. Ideally, these words are those which will have stability over time and not be changed with the normal evolution of the web page. For example, words such as "product number", "item number" "product code" or the like may signal a product identification number, while words like "quantity" and "price" may signal the number of items purchased and their per piece cost. The filters may look at not only the words themselves, but their proximity to other words, formatting, and the like, and may look at previously stored keystrokes by the purchaser 20.

Figure 3:
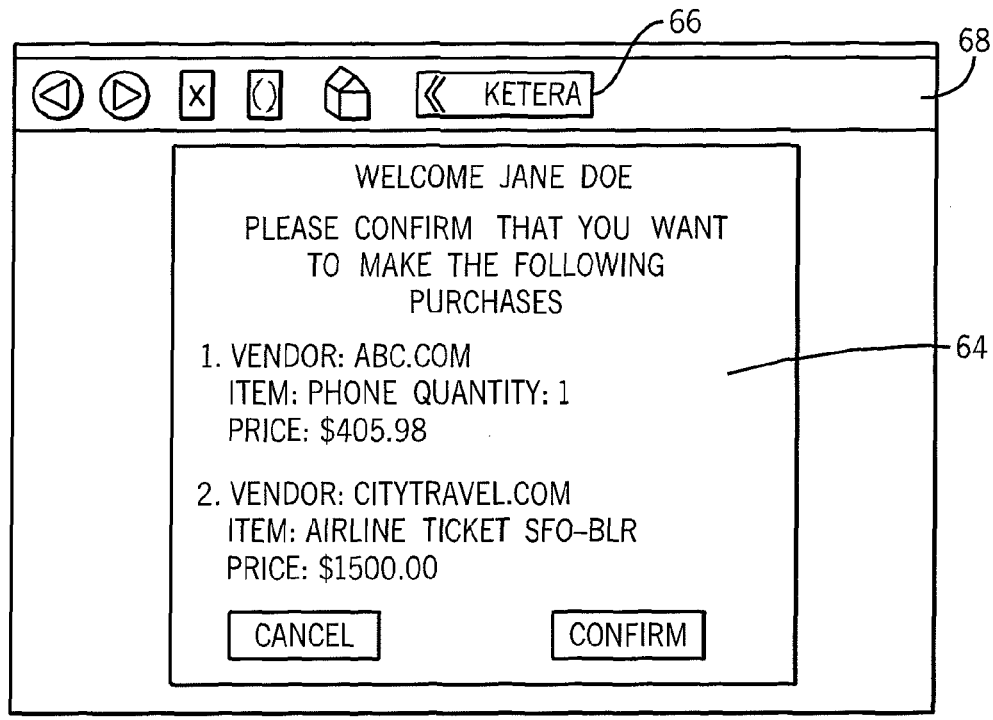
FIG. 3 is a screen shot from a browser program showing a web access program toolbar button for invoking the authorization procedure of the present invention after a web purchase has been initiated and showing a confirmation message.

A set of filters is established to read the HTML and extract, with a fair degree of reliability, the data. Again, the adapter may be generally applicable to multiple web pages, and/or different adapters can be called depending on the URL of the website. Referring to FIG. 3, once the adapter has extracted the necessary data, the purchaser 20 may be asked to verify that the adapter has correctly extracted the product identification, for example, and other salient information, by a pop-up window 64 that requires a positive confirmation by the purchaser. This confirmation is shown by process block 58.

Referring now to process block 50, when a web service is available, the product identification data (which may be extracted using the filters described above) is used together with the known URL of the website 34 (obtainable from the browser 29) to interrogate the web service associated with that website 34 for remaining data that will have been tagged for easy identification. As described above, the URL of the web service may be identified by a look-up table of known web services periodically updated over the Internet 30 as is understood in the art. The data obtained from the web service may include product description and price and other terms that will be needed for the approval process. This data may also be verified with the user using a verification pop-up window 64 (shown in FIG. 3).

Figure 4:
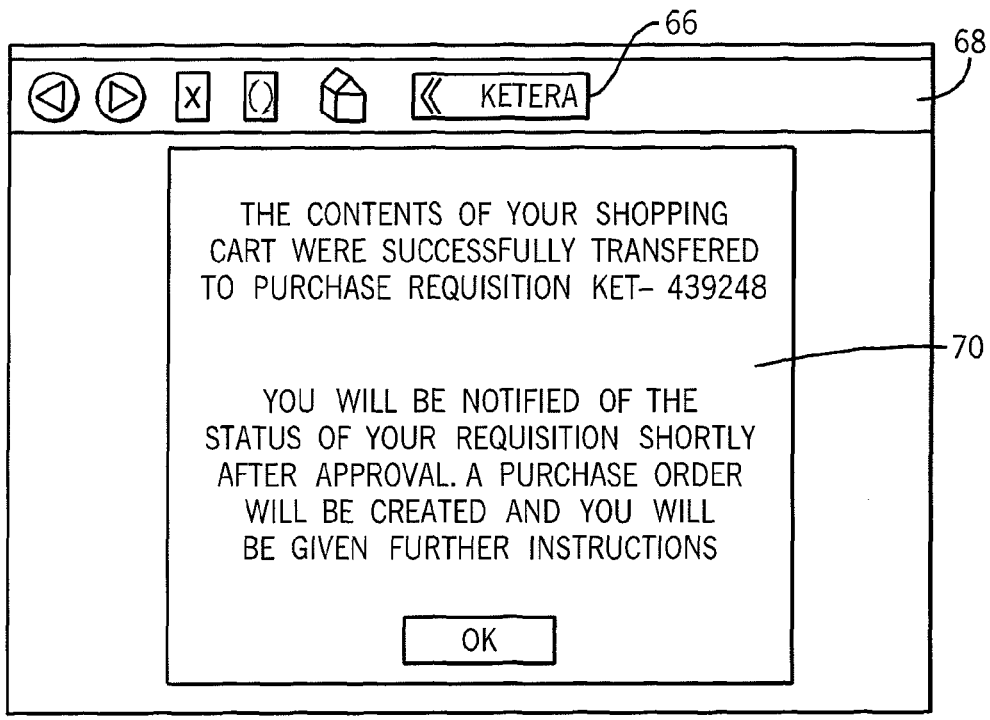
FIG. 4 is a figure similar to that of FIG. 3 showing a confirmation screen indicating that the approval process has been invoked.

At process block 52, the web access program 28 formats this information to be received by the procurement program 24 in the manner of standard information obtained from pre-approved products of catalog pages 18, and the information is transmitted to the procurement program 24, for example, by file transfer between the browser 29 and the server program 25. This process is confirmed to the user by a pop-up confirmation window 70 (shown in FIG. 4) providing a requisition number and informing the user to await further instructions.

The procurement program 24, upon receiving this information, executes the necessary steps previously used for standard procurement to obtain approval optionally applying different rules to Internet purchases. Special rules may be applied to web purchases including rules blocking such purchases to certain individuals, requiring a search of the catalog pages 18 before any web purchase, or requiring that the product purchased on the web be less costly or unavailable in the products in the catalog pages 18. Standard rules relating to adequacy of budget, purchasing authority, and the like, may also be applied.

If approval is obtained, an order may be placed as indicated by process block 54 using the same web service used to obtain the product information as accessed directly by the procurement program 24 operating through the server program 25. The order generated at the website 34 by the purchaser 20, up to the last step of purchase by the purchaser 20, is typically abandoned by instructions obtained by the web access program 28 from the procurement program 24 or by the purchaser 20 based on instructions forwarded to the purchaser 20 from the procurement program 24 such as may generate a pop-up window or the like instructing the purchaser 20 to close the website connection.

Referring again to decision block 46, in those cases where no web service is available for the website 34, or when it is unknown whether a web service is available for the website 34, the web access program 28 proceeds from process block 56 where an adapter is selected, possibly keyed to the URL of the website 34, that performs the data extraction. Again, this adapter may review the HTML code of the particular site using programmed filters to identify the necessary data from field names, surrounding text and the like. The adapter may also look for identifying characteristics of the website 34, for example, indicating a standard shopping cart system is being used, to better tailor itself to the data extraction problem. The task of writing adapters may be further simplified by limiting the purchasers 20 to websites 34 for which adapters have been prepared and tested. In the process of generating the adapters, the HTML data may be filtered to remove hyperlinks, images, and some types of dynamic content.

Once the data is identified, the purchaser 20 may confirm the data at process block 58 to make sure it is accurate, making any necessary corrections.

At step 60, the data is forwarded to the procurement system as per process block 52. This process is confirmed to the user by a pop-up confirmation window 70 (shown in FIG. 4) providing a requisition number and informing the user to await further instructions. If approval is granted at process block 62, a new order is generated. Generally, this new order will be an order at the website 34 where the procurement program 24 imitates a user making a new purchase on the website. An order script, simulating a user placing an order, may be associated with the adapter. This simulation simply opens a new connection with the website 34 and transmits the necessary synthesized keystrokes and mouse actions to construct the identical order to that initialized by the purchaser 20 but also completing the order. The purchaser's partial order is then cancelled as described above. Alternatively a purchase order may be generated and forwarded to the user.

A corporate credit card number may be used to simplify the purchasing process, eliminating the need for the employee to be reimbursed, and preventing accidental out of system orders by employees.

As will be understood to those of ordinary skill in the art, the procurement program 24 and the web access program 28 may be freely distributed in whole or in part among the connected computers 12 and 16 of the system 10 and or other intercommunicating computers. The present invention can also be employed to capture and control web purchases even if an internal catalog of contract suppliers is not used.

It is specifically intended that the present invention not be limited to the embodiments and illustrations contained herein, but include modified forms of those embodiments including portions of the embodiments and combinations of elements of different embodiments as come within the scope of the following claims.

We claim:

1. An electronic procurement system comprising:
    at least one electronic computer
    a procurement program fixed in non-transient medium and executed by the least one computer for receiving a request for purchase of a product by a user together with product identification information associated with the request, the procurement program automatically processing approvals for purchase of the product; the processing of approvals applying a set of predefined rules to the product identification information and information about the user to determine whether the order will be generated;
    an electronic catalog of products of contract suppliers, the electronic catalog communicating with the at least one electronic computer executing the procurement program to be searched by a user to find a first product and to provide product identification information for the first product to the procurement program for the processing of approval of purchase of the first product; and
    a web access program fixed in non-transient medium and executed by the at least one computer for communicating with the procurement program and web pages at third party web sites of non-contract suppliers, the web access program allowing web sites of the non-contract suppliers to be searched by a user to find a second product, and upon a command by the user contemporaneously with the finding of the second product by the user, the web access program providing product identification information for the second product to the procurement program for the processing of approval of purchase of the second product where the product information is automatically extracted directly from the web sites of the non-contract suppliers in a form that may be processed by the procurement program for automatically processing approvals for purchase of the second product according to the set of predefined rules and for automatically populating an order for the second product with information suitable for ordering the product.

2. The electronic procurement system of claim 1 wherein the procurement program generates an order for the product after approval is processed.

3. The electronic procurement system of claim 1 wherein the web access program collects product identification information for the second product by filtering web page data associated with a web order partially completed for the second product on a web page of the non-contract supplier by the user, the filtering extracting product information from data on the web sites, the extracted product information being in a form that may be processed by the procurement program for automatically processing approvals for purchase of the second product according to the set of predefined rules.

4. The electronic procurement system of claim 3 wherein after the procurement program has approved the second purchase, the procurement program generates a message sent to the user that notifies the user to terminate the web order.

5. The electronic procurement system of claim 1 wherein the web access program selects a filter for filtering web page data from a set of different filters identified to different websites.

6. The electronic procurement system of claim 1 wherein the web access program collects product information for the second product by consulting a web service associated with a web page offering the second product.

7. The electronic procurement system of claim 1 wherein the web access program allows both the electronic catalog of products of contract suppliers and the web pages of non-contract suppliers to be accessed.

8. The electronic procurement system of claim 1 wherein the predefined rules include checking whether a user's budget will allow the purchase.

9. The electronic procurement system of claim 1 wherein the predefined rules include checking that the purchaser has consulted the electronic catalog for the second product.

10. The electronic procurement system of claim 1 wherein the predefined rules include determining that the second product can be found less expensively in the electronic catalog.

11. The electronic procurement system of claim 1 wherein the web access program identifies preferred web pages to the user.

12. The electronic procurement system of claim 11 wherein the preferred web pages are those having either web services or filters that may be used to extract product identification information from web page data.

13. The electronic procurement system of claim 1 wherein the procurement program processes approvals for purchases by communicating with an authorizing individual.

14. The electronic procurement system of claim 1 wherein the web access program includes a web service database of web services linked to URL's of web pages and determines whether a web service is available by reading a current URL of the web page and consulting a table.

15. The electronic procurement system of claim 14 further including a web service update program downloading new web secure data to the web access program.

* * * * *